United States Patent [19]

Ririe et al.

[11] Patent Number: 4,865,722

[45] Date of Patent: Sep. 12, 1989

[54] METHOD AND APPARATUS FOR SEPARATION USING FLUIDIZED BED

[76] Inventors: Max Ririe, 149 Chestnut St., Idaho Falls, Id. 83402; Devon Albert, 431 Calder, American Falls, Id. 83211; Lynn F. Johnson, P.O. Box 47, Sterling, Id. 83279

[21] Appl. No.: 92,030

[22] Filed: Sep. 1, 1987

[51] Int. Cl.[4] .......................... B07B 4/08; B07B 11/00
[52] U.S. Cl. ..................................... 209/474; 209/486; 209/492; 209/493; 209/498; 209/502
[58] Field of Search .................... 209/19, 20, 44, 44.1, 209/422, 466–469, 474–476, 485, 486, 487–494, 497–499, 502, 508

[56] References Cited

U.S. PATENT DOCUMENTS

| | | | |
|---|---|---|---|
| 1,068,162 | 7/1913 | Payne | 209/486 X |
| 1,837,299 | 12/1931 | Taggart | 209/485 X |
| 2,007,190 | 7/1935 | Fraser | 209/474 |
| 2,093,470 | 9/1937 | Morgan | 209/474 |
| 2,101,295 | 12/1937 | Rusk | 209/486 X |
| 2,154,784 | 4/1939 | Stump | 209/502 X |
| 2,303,367 | 12/1942 | Kendall et al. | 209/492 X |
| 3,349,912 | 10/1967 | Eveson et al. | 209/502 X |
| 3,367,501 | 2/1968 | Eveson | 209/492 X |
| 4,035,288 | 7/1977 | Gibert et al. | 209/502 X |
| 4,322,287 | 3/1982 | Zaltzman et al. | 209/474 X |

FOREIGN PATENT DOCUMENTS

| | | |
|---|---|---|
| 0946480 | 1/1964 | United Kingdom . |
| 1153722 | 5/1969 | United Kingdom . |
| 2078552 | 1/1982 | United Kingdom . |

OTHER PUBLICATIONS

Zaltman, Feller, Mizrach and Schmilovitch, "Separating Potatoes from Clods and Stones in a Fluidized Bed Medium", *Transactions of the ASAE*, vol. 26, No. 4, pp. 987–990 & 995 (1983).
Clarke, "Celaning Seeds by Fluidization", J. Agric. Engng. Res. 31, pp. 231–242 (1985).

*Primary Examiner*—Robert B. Reeves
*Assistant Examiner*—Edward M. Wacyra

[57] ABSTRACT

A separator suitable for processing agriculture products in a fluidized bed flowing through an inclined trough under the influence of gravity. The fluidization medium is recirculated from the output end of the trough back to the input end thereof using a recirculation drum horizontally disposed laterally encircling the output end of the trough and supported for rotation about its own longitudinal axis. The inner surface of the drum includes an endless series of receiving pockets for collecting sand below the output end of the trough and lifting it thereabove. A damper at the output end of the trough is used to accelerate the establishment of the fluidized bed therein by temporarily obstructing the flow of fluidized bed. An ultrasonic sensor is used to determine the depth of the trough and based thereon to control the rate at which fluidization medium is provided thereto. Pretreatment of air forced through the fluidization medium to create the fluidized bed occurs through the use of an air intake stack extending a substantial distance above the separator, an air filter for removing from ambient air particles exceeding a predetermined size, and an air heater for raising the temperature of the air adequately to permit it to remove moisture from the fluidized bed.

75 Claims, 7 Drawing Sheets

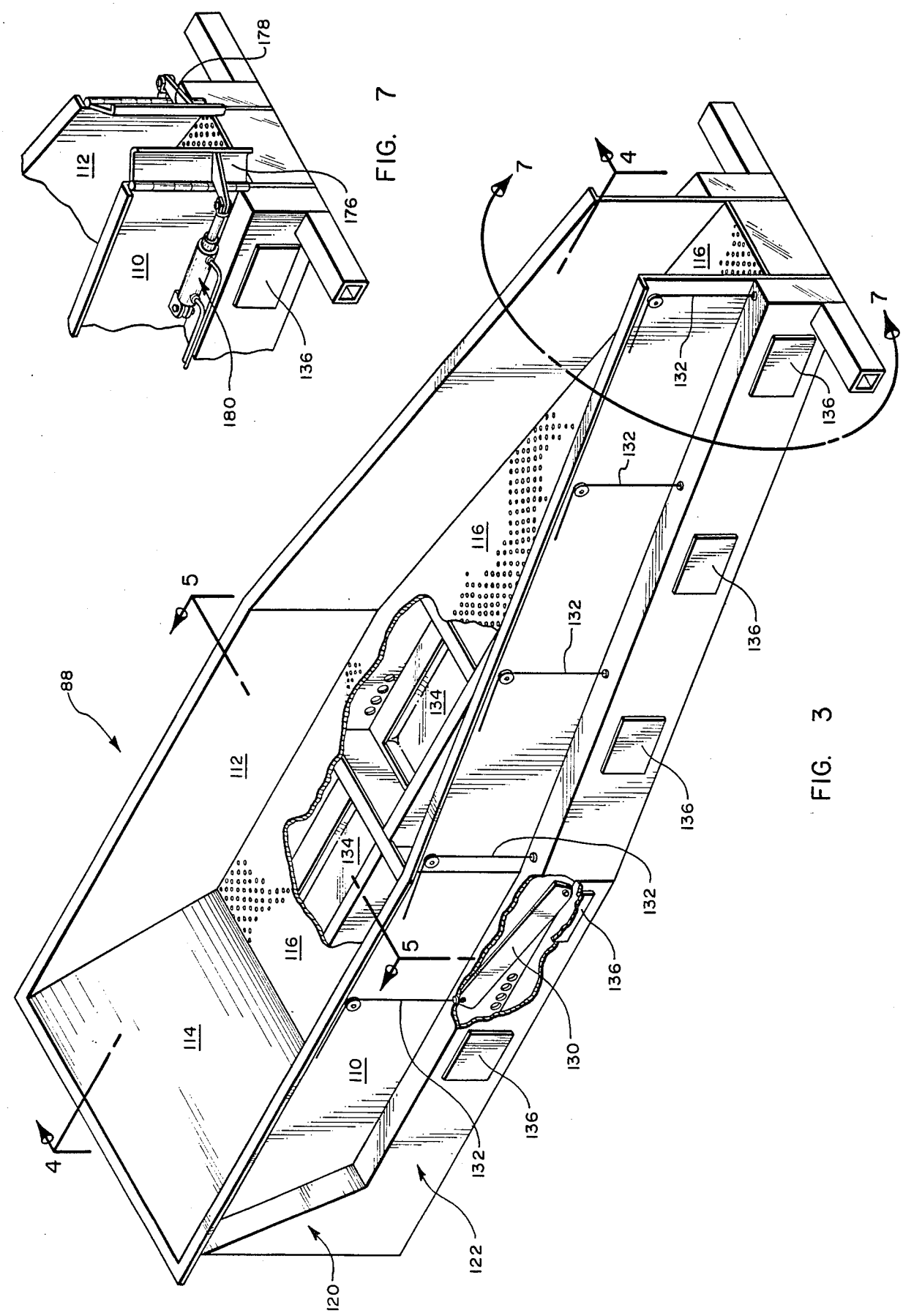

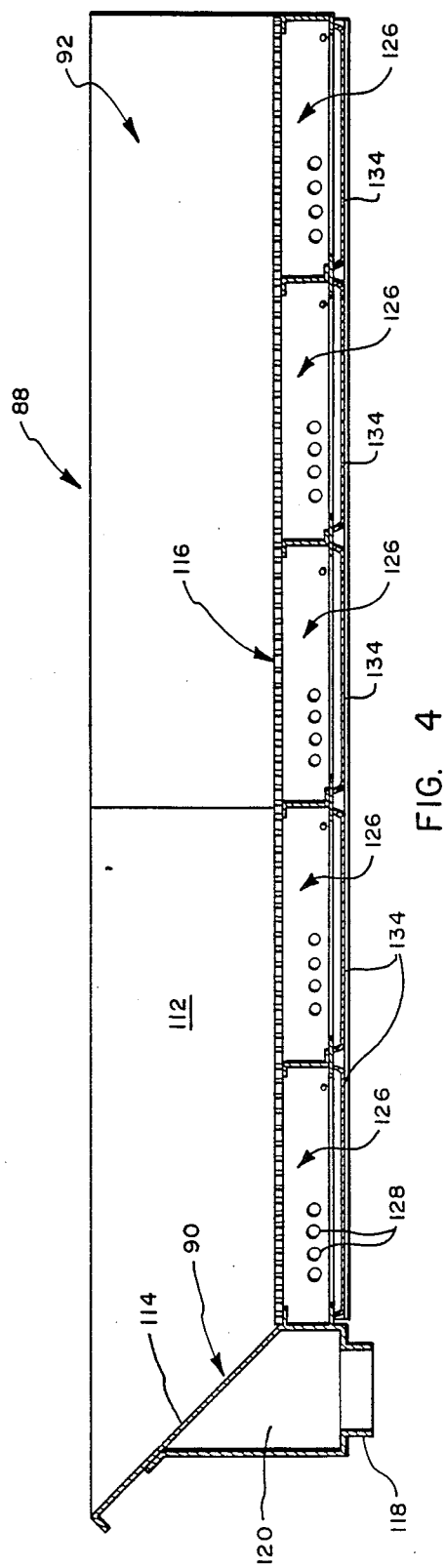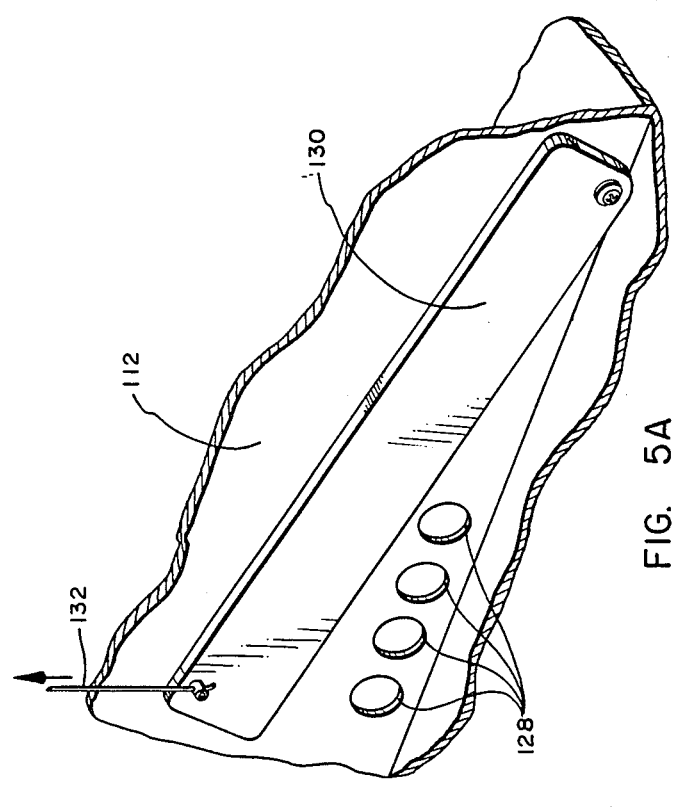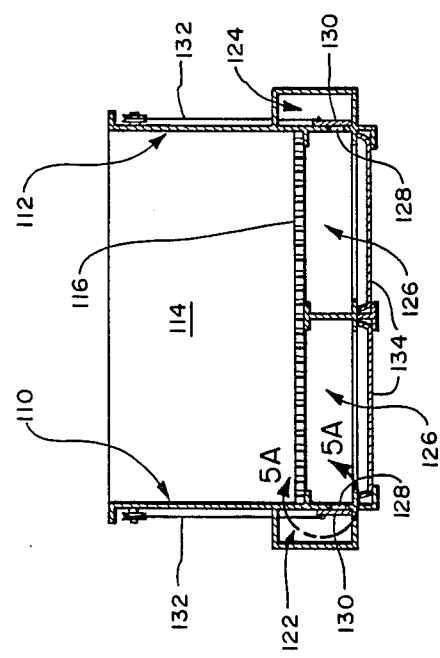

METHOD AND APPARATUS FOR SEPARATION USING FLUIDIZED BED

BACKGROUND OF THE INVENTION

1. Field of the Invention

The present invention relates to methods and apparatus using fluidized bed principles for separating mixtures of solid articles of different densities, and more particularly to such methods and apparatus as are applicable to the grading of agricultural products or the separation of agricultural products from associated waste materials.

2. Background Art

The use of density variation as a means of separating mixtures of articles is widespread. In agriculture, the separation and sorting of produce on this basis is accomplished using both wet and dry methods.

Wet methods use a liquid as a medium with which to separate denser articles, which sink in the given liquid, from the lighter ones that will float thereupon. Because of the use of fluids, however, these techniques have disadvantages which limit their application with agriculture products. Some liquids employed are expensive or present fire and social hazards when used in large quantities. In addition, some agriculture commodities require prewetting in order to remove air bubbles and thereby permit their effective sorting in fluids. Other products are not susceptible to processing in any liquid because the absorption of liquid adversely effects the properties of the product. Finally, the liquids involved frequently become contaminated with foreign materials during the sorting process, effecting their density and requiring periodic changing or filtering.

Dry methods of sorting or cleaning of agriculture products are not afflicted by the above-described disadvantages. Some dry methods of sorting employ a form of pneumatic separation based on a combination of differing densities and differing aerodynamic properties associated with the components to be sorted. In such separation schemes, a gas, such as air, is forced upwardly through a moving bed of the mixture to be separated. This gas flow through the interstices of the particles of the mixture tends to disengage the particles from each other, permitting the gas flow to support at least some of the weight thereof. As a result, the bed of the mixture resembles a liquid of high viscosity, and the particles of the mixture are freed to a degree to migrate within the bed under the influence of physical forces that might tend to induce separation among the constituent components. In this respect, such methods employ fluidized bed principles.

The separation that occurs when a mixture to be separated is itself fluidized is not one that results exclusively due to differing density among the components of the mixture. Instead, the aerodynamic properties of the particles of the mixture also have a substantial impact upon the rate and quality of the separation that results. The upward flow of gas through the mixture will tend to draw with it the less compact particles of the mixture, regardless of their density.

Typically, the fluidization of such a mixture is effected as it passes down an inclined trough. At the discharge end of the trough the mixture of the materials has become somewhat stratified according to the combined density and aerodynamic property of the component particles. Nevertheless, such devices have several inherent drawbacks which render them less than optimally desirable in relation to the broad range of circumstances in which agriculture separators of the dry variety are nevertheless desirable.

First, separators which pneumatically fluidize the actual mixture to be separated have limited separation effectiveness. While the upper and lower layers of the stratified mixture discharged from the end of the separator trough may be relatively pure, the layers intermediate thereto continue to comprise a mixture of particles of both densities. This problem is ameliorated to some degree by horizontally narrowing the separation between the vertical walls of the trough in the vicinity of its discharge end. This has the effect of increasing the depth of the flow at that point, affording more vertical distance between the separated top and bottom layers of the mixture. Still, at some point between these two extreme layers, the two materials of differing densities remain substantially intermixed in an interfaced layer. This fact precludes the achievement of optimal separation effectiveness.

A second, more profound drawback of separation methods in which the mixture to be separated is itself pneumatically fluidized arises from the fact that fluidization of the mixture is not possible if the particles of the mixture have diameters greater than approximately three or four millimeters. Thus, such methods are effective only in separating small products, such as grain cereal. They cannot be used to separate or sort large produce.

Toward that end, resort has been made to the use of fluidized beds which are constituted of a material other than the mixture to be separated. For the purpose of separating mixtures of larger solid bodies of differing densities, a fluidized bed created from such a fluidization medium behaves in a manner analogous to a liquid, but without wetting the articles of the mixture it is used to separate. Pieces of solid material less dense than the apparent density of the fluidized bed will float on the surface thereof. These will hereinafter be referred to as the "float fraction" of such a mixture. Pieces of solid material which are more dense than the apparent density of the fluidized bed will on the other hand sink to the bottom of the bed. These will hereinafter be referred to as the "sink fraction" of such a mixture.

For such separation to occur, the apparent density of the fluidized bed must be intermediate the densities of the float and sink fractions of the mixture. Additionally, the particle size of the fluidization medium must be smaller by several orders or magnitude and the size of the bodies contained in the mixture.

The use of a fluidization medium other than the mixture to be separated advantageously reduces the influence on the process of other separation factors, such as aerodynamic characteristics, and reduces the process to one in which separation is accomplished substantially on the basis of differing density only. In addition, the presence of a layer of fluidization medium intermediate the float fraction of the mixture on top of the fluidized bed and the sink fraction of the mixture at the bottom thereof permits a clean separation of the float and sink fractions. This is accomplished by separating the upper portion of the fluidized bed with the float fraction entrained therein from the lower portion thereof having the sink fraction entrained therein. Thereafter the two components are cleaned independently to remove any fluidization medium, and close to one hundred percent separation effectiveness between the float and sink fractions of the mixture can be achieved.

A dry method separator of this type, which is particularly adapted to the sorting and cleaning of agriculture products, is disclosed in United States Patent Application No. 055,705 filed in the United States Patent and Trademark Office on May 29, 1987. In that device, a fluidization medium, such as sand, is used to create a moving fluidized bed of density intermediate the densities of the components of a mixture of agriculture products. This is accomplished in an inclined trough, the vertical sidewalls of which narrow toward the discharge end thereof in order to increase the depth of the fluidized bed as it leaves the trough. The mixture to be separated is added to the fluidized bed at an initial point in its flow near the upper end of the trough. Separation of the components of the mixture is effected while they are moving with the fluidized bed through the trough.

Less dense components of the mixture, constituting the float fraction thereof, rise to the surface of the fluidized bed and are displaced therewith along the length of the trough under the effect of the dynamic forces of the moving stream. Denser components, constituting the sink fraction of the mixture, settle to the bottom and are similarly advanced along the length of the trough. At the discharge end of the trough, the top portion of the fluidized bed entraining the float fraction of the mixture is discharged separately from an underflow of the fluidized bed which entrains therewith the sink fraction of the mixture. Appropriate means are then provided for cleaning the fluidization medium from the sink and float fractions of the mixture. The fluidization medium is then resupplied by a system of conveyor belts to the upper end of the trough. While the resulting apparatus and method result in a very high separation effectiveness, several problems remain.

First, the use of conveyors to resupply fluidization medium to the top end of the trough permits substantial unrecoverable losses of the fluidization medium during the recirculation cycle. Fluidization medium tends to fall from the edges of the conveyors involved and cannot be returned to the system. Thus, a gradual dissipation of fluidization medium occurs, requiring frequent replenishment from a reserve thereof. As the fluidization medium must necessarily exhibit a relatively consistent degree of cleanliness and uniform particle size, it can only on occasion be obtained on location. This renders its dissipation through operation of the separator a significant problem.

In addition, the use of conventional conveying belts to recirculate the fluidization medium, results in a separation apparatus of excessive size. Lengths in excess of 65 feet have been required to adequately recirculate fluidization medium. This has naturally effected the cost and mobility of separators constructed along such lines.

It has also been found that the fluidization medium utilized in such devices has a tendency to accumulate moisture, either from water contained in the mixture of articles to be separated, or from the ambient precipitation of moisture in the form of rain or dew onto the device when it is not in use. Moisture in the fluidization medium results in a fluidized bed of excessive viscosity, producing reduced separation effectiveness, as well as the clogging and rusting of the machinery involved. The latter can cause significant down time and require wholesale replacement of fluidization medium.

In addition, difficulty has been encountered in establishing an adequately deep fluidized bed to permit easy separation of sink and float fractions entrained therein. Often the process of deepening the fluidized bed requires a lengthy start up period. Depending on parameters of trough size, slope, or airflow, adequate depth has on occasion been found impossible to attain. In the case of slow depth attainment, operating time is increased undesirably. Where desired depth cannot be achieved, the efficiency of separation is sacrificed.

A second problem encountered in relation to the maintenance of a desired depth in the fluidized bed has been caused by the disruption in the depth of the bed created when the mixture to be separated is added thereto. In almost all circumstances, the constancy of the rate of supply of that mixture to the separator cannot be assured. The size of the particles in the mixture contributes to this difficulty. In addition, quantities of the mixture must be brought to the separator by truck in batches. The initiation and termination of the feeding of each batch to the separator dramatically alters the volume of the mixture added to the fluidized bed. This accordingly affects the depth of the bed, creating instabilities and in many cases reducing separation efficiency. Very often differing float or sink fraction densities in differing batches of mixtures alter the rate at which those sink and float fractions are cleared from the trough from which the fluidized bed is flowing. Any change in the rate of evacuation of either or both fractions of the mixture also affects the volume of material contained in the trough and, accordingly, the depth of the fluidized bed.

Fluidization in such devices is effected by forcing upwardly through the fluidization medium a gas, such as air. This is effected by using a perforated air distribution sheet as the floor of the trough. Air under pressure is supplied in a plenum on the underside of the air distribution sheet and percolates upwardly through the fluidization medium thereabove. The perforations size and density of the air distribution sheet must be carefully determined. The perforations must be small enough to prevent fluidization medium in the trough above the sheet from entering or clogging the air passageways through the sheet. Use of the separator, however, generates a great deal of dust. Thus, air forced through the air distribution sheet is frequently heavily laden with particles large enough to block the perforations therethrough. Such blockage reduces the volume of air that passes through the fluidization medium above the air distribution sheet, altering the resulting density of the fluidized bed created. When that density ceases to be intermediate the densities of the float and sink fraction of the mixture involved, the separator no longer operates effectively. Machine downtime is necessitated to permit the removal of such contaminants.

SUMMARY OF THE INVENTION

In light of the above-described deficiencies in prior sorters, the objects of the present invention will be briefly stated.

One object of the present invention is an improved method and apparatus for efficiently separating and sorting agriculture products using a dry method of separation that employs fluidized bed principles and a fluidized medium distinct from the mixture to be separated.

Another object of the present invention is to provide such a method and apparatus which minimizes the loss of fluidization medium as it is recirculated.

It is further an object of the present invention to reduce the overall size of the apparatus required to effectively separate and sort agriculture products in a manner described above.

Another object of the present invention is to overcome or prevent the accumulation of moisture in the fluidization medium involved in such methods and apparatus.

It is also an object of the present invention to provide a method and apparatus as described above in which a fluidized bed of acceptable depth may be rapidly established and consistently maintained.

A final object of the present invention is to reduce the inefficiencies associated with the presence of significant levels of contaminants in the air in the vicinity of the separator.

Additional objects and advantages of the invention will be set forth in the description as follows, and in part will become apparent from the description, or may be learned by the practice of the invention. The objects and advantages of the invention may be realized and obtained by means of the instruments and combinations particularly pointed in the appended claims.

To achieve the foregoing objects, and in accordance with the invention as embodied and broadly described herein, a separator is provided in which a fluidized bed formed in an inclined trough flows therethrough and is used to effect the separation of a mixture of articles to a float and a sink fraction thereof. In one aspect of the present invention a medium recirculation means is provided for supplying fluidization medium to the input end of the trough. The medium recirculation means laterally encircles the output end of the trough so as to collect fluidization medium therefrom below the output end thereof and lift it back into the trough.

In a preferred form of the invention, this involves a recirculation drum horizontally disposed laterally encircling the output end of the trough in combination with a hopper above the trough within the drum and a feed conveyor at the bottom of the hopper for moving fluidization medium therein in the direction of the input end of the trough. The interior surface of the recirculation drum is provided with a continuous plurality of transport pockets which receive fluidization medium from the output end of the trough and, by rotation of the recirculation drum, unload the fluidization medium into the hopper above the trough.

A medium recirculation means according to the principles of the present invention reduce the loss of fluidization medium in the process of its recirculation and serves to shelter the fluidization medium from precipitation and moisture accumulation when the sorter is not in use. Additionally, the absence of conventional conveyor belts for recirculation fluidization medium substantially shortens the length required in the sorter.

In another aspect of the present invention, air pretreatment means is employed for producing from ambient air conditioned air suitable for creating a fluidized bed. The air pretreatment means can include either or both a particle filter for removing from ambient air particles exceeding a predetermined particle size or an air heater for heating ambient air to a temperature adequately elevated to remove moisture from the fluidized bed through which it is forced. Air reconditioned by filtering does not clog the air distribution plate. Heated air drives moisture from the fluidized bed.

In another aspect of the present invention, control means are provided for sensing the depth of the fluidized bed and based thereon for controlling the rate at which fluidization medium is supplied to the input end of the trough. In this manner an optimum depth in the fluidized bed can be maintained on an automatic basis, regardless of variations in the volume of the mixture entered thereinto for separation purposes.

In yet a final aspect of the present invention, restriction means are provided for assisting the establishment of the fluidized bed by temporarily retarding the flow of the fluidized bed at the output end of the trough without substantially changing the volume of the trough. By way of example, the restriction means can take the form of an obstruction, such as a damper, located at the output end of the trough and being temporarily and adjustably interposable to the flow at a portion of the cross section of the fluidized bed. Once the desired depth has been established in the fluidized bed, the retarding effect of the restriction means can be lessened or terminated.

Finally, the present invention provides a method for separating a mixture of articles using a fluidized bed. In the method the fluidized bed is established by supplying fluidization medium to the upper end of an inclined trough forcing air upwardly through the fluidization medium, and temporarily retarding the flow from the outward end of the trough of a portion of the resulting fluidized bed operating on the sink fraction of the mixture. Once the fluidized bed is stabilized at a desired depth, the retarding of its flow is terminated and the mixture of articles is supplied to the upper end of the trough for separation.

In one aspect of the method of the present invention, the air forced upwardly through the fluidization medium is filtered to remove therefrom articles exceeding a predetermined particle size. Optionally this same air may be heated to a temperature adequately elevated to remove moisture from the fluidization medium.

In supplying fluidization medium to the input end of the trough, fluidization medium is collected at the output end of the trough in receiving pockets on the receiving surface of a recirculation drum horizontally disposed laterally encircling the output end of the trough. The recirculation drum is rotated about its longitudinal axis to lift the fluidization medium thus collected above the trough, where it is received in a hopper disposed above the trough within the recirculation drum. Fluidization medium is removed therefrom to the input end of the trough on a feed conveyor.

Additionally, the method of the present invention may include the step of maintaining the fluidized bed at a predetermined depth through the use of a device for sensing that depth and on the basis thereof of controlling the rate at which fluidization medium is supplied to the input end of the trough.

By use of the apparatus and method of the present invention briefly described above, an apparatus of reduced size results in which losses of fluidization medium due to recirculation are minimized. The use of a recirculation drum laterally encircling the output end of the fluidized bed trough in addition protects the fluidization medium from accumulating moisture when the device is not in use. Preconditioning of the air used to effect fluidization dries out any moisture that does lodge in the fluidization medium. Air filtering reduces clogging of the air distribution plate, improving the stability of operation and reducing downtime for cleaning. Finally, the invention permits the rapid establishment of a fluidized bed of desired depth and the maintenance of that depth automatically despite variations in the volume of the mixture added to the fluidized bed for separation purposes. The method and apparatus disclosed hereinafter with some particularity has special application to the separation of potatoes from clods and rocks following harvesting.

BRIEF DESCRIPTION OF THE DRAWINGS

In order that the manner in which the above-recited and other advantages and objects of the invention are obtained, a more particular description of the invention briefly described above will be rendered by reference to the specific embodiments thereof which are illustrated in the appended drawings. Understanding that these drawings depict only typical embodiments of the invention and are therefore not to be considered limiting of its scope, the invention will be described with additional specificity and detail through the use of the following drawings in which:

FIG. 3 is a perspective partial cut-away view of the trough of the separator of FIG. 1;

FIG. 4 is a cross-sectional elevation view of the trough of FIG. 3 taken along section line 4—4 shown therein;

FIG. 5 is a transverse cross-sectional view of the trough of FIG. 3 taken along section line 5—5 shown therein;

FIG. 5a is a detailed prospective view of an air control mechanism for use in the separator of FIG. 1;

FIG. 7 is a detailed prospective view of an alternate embodiment of the restriction means of the present invention;

DESCRIPTION OF THE PREFERRED EMBODIMENT

Figure 1:
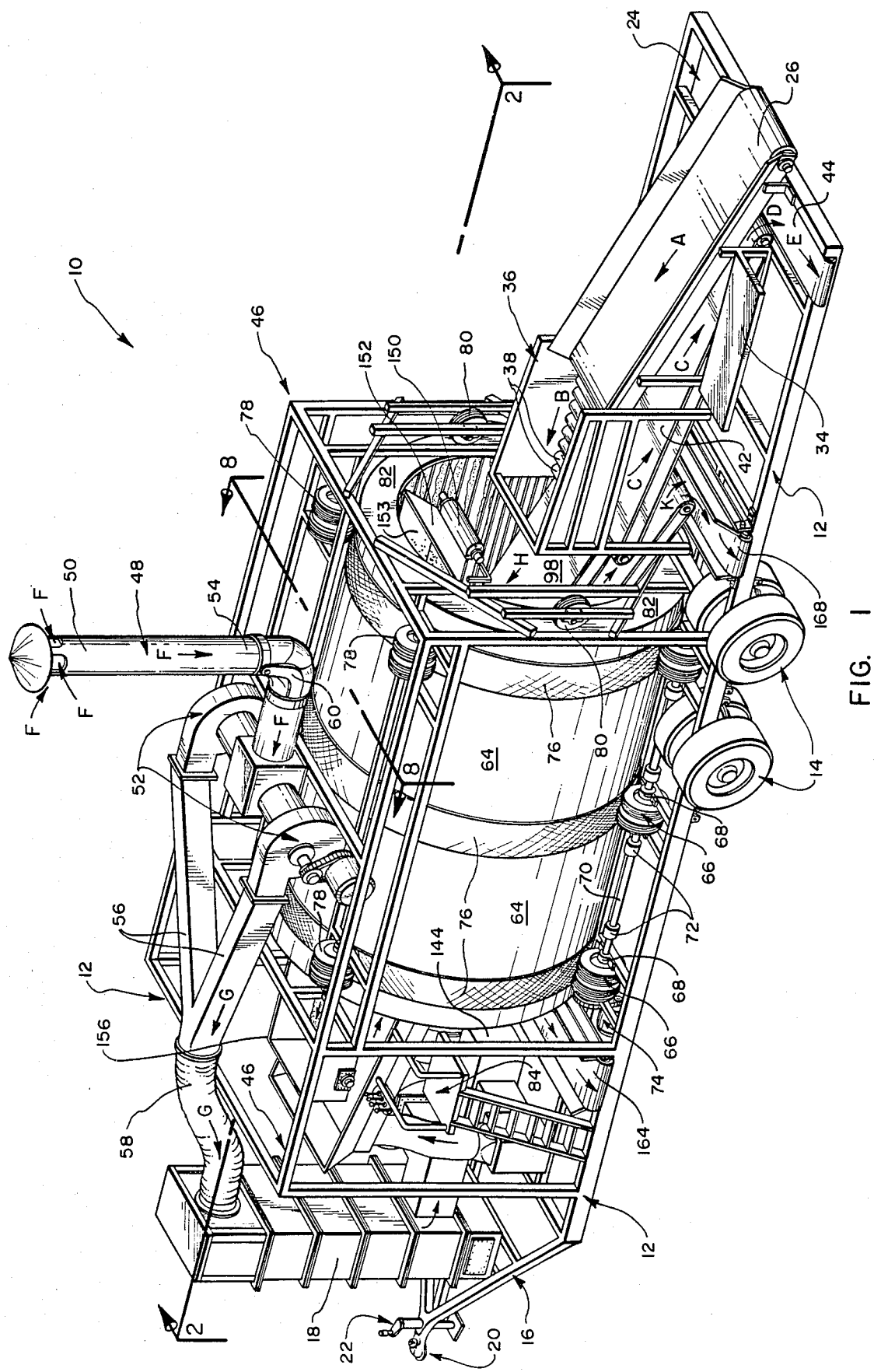
FIG. 1 is a perspective view of one embodiment of a separator incorporating the teachings of the present invention.

A general overview of the major functional components of a fluidized bed separator incorporating the teachings of the present invention may be obtained by reference to FIG. 1. There a fluidized bed separator 10 can be seen to comprise a frame 12 supported and rendered mobile on tires 14.

One end of frame 12 terminates in a cantilevered triangular platform 16 upon which is supported a columnar enclosure 18, the function of which will be explained below. The apex of triangular support platform 16 remote from separator 10 includes a hitching mechanism 20 by which separator 10 may be attached to a vehicle and drawn from one work site to another on tires 14. For convenience the end of separator 10 that includes triangular support platform 16 will be referred to hereinafter as the "front end" of separator 10, as it precedes the other portions thereof when separator 10 is being towed by a vehicle. Adjacent hitching mechanism 20, frame 12 also includes an adjustable footing 22 for supporting the front end of separator 10 and leveling frame 12 when hitching mechanism 20 is not connected to a towing vehicle.

The end of separator 10 opposite from the front end thereof terminates in a cantilevered rectangular support platform 24 upon which is mounted a mixture receiving conveyor 26 which receives mixtures of articles to be processed by separator 10 and advances the mixture in the direction indicated by arrow A. For the sake of simplicity the power source and drive mechanism for mixture receiving conveyor 26, and other conveyors presently to be described, have not been depicted in the figures. Similarly, some supporting structure, such as frames, braces, and adjustment mechanisms for various functional components of separator 10 have been eliminated.

A typical mixture 28 for processing by separator 10 is received on mixture receiving conveyor 26. Mixture 28 includes a float fraction 30 of particles generally having a first density and a sink fraction 32 of articles having a second density that is greater than the first. In the case of a mixture of harvested potatoes, the float fraction will include potatoes of a conventionally acceptable commerical size while the sink fraction will be made up of clods and rocks ranging in size from about 0.25 to about 3.00 inches. While particles that are smaller than 0.25 inches do typically accompany a mixture of harvested potatoes, these, as will be seen, are removed prior to processing by the fluidized bed of separator 10 and thus will not be considered herein as part of sink fraction 32.

The mechanisms of separator 10 are designed to accommodate potatoes that are larger than those of a commercially acceptable commerical size, but it is possible for exceedingly large clods or rocks in the sink fraction of a mixture of potatoes to become lodged at various points in the processing mechanisms of separator 10. Accordingly, adjacent mixture receiving conveyor 26 supported on rectangular support frame 24 is a section of flooring 34 upon which a worker may stand and, by observing mixture 28 passing on mixture receiving conveyor 26, remove therefrom articles of sink fraction that are unacceptably.

All other articles on mixture receiving conveyor 26 arrive in a cleaning enclosure 36 for gentle agitation and advancement in the direction indicated by arrow B on a floor of individually driven spaced-apart cleaning rollers 38. Cleaning rollers 38 may each advantageously be provided in a known manner with a plurality of short radially extending paddle-like projections which lift and tumble the articles of mixture 28 as cleaning rollers 38 are rotated. As most clearly understood by reference to FIGS. 1 and 2 taken together, this initial processing of mixture 28 permits fine contaminants 40, such as sand, gravel, and dust, which would otherwise form a part of sink fraction 32 of mixture 28 to fall downwardly out of cleaning enclosure 36 through the separations between adjacent cleaning rollers 38 in the direction shown by arrows C.

Fine contaminants 40 come to rest on a first fine particle conveyor 42 for movement in the direction shown by arrow D to a second fine particle conveyor 44 for removal from separator 10 in the direction shown by arrow E. The preliminary cleaning of mixture 28 to remove fine contaminants 34 reduces the volume of sink fraction 32 in mixture 28 which must be processed by separator 10 and thus reduces the amount of fine dust that eventually becomes mixed with the fluidization medium employed in separator 10. This has the consequence of reducing the levels of airborne dust in the vicinity of separator 10.

In addition to supporting the mechanisms which effect the above-described preliminary cleaning, rectangular support platform 24 upholds other conveyors which will be described presently. For convenience the end of separator 10 that includes rectangular support platform 24 will be referred to hereinafter as the "back end" of separator 10, as it follows the other portions thereof when separator 10 is being towed by a vehicle.

Referring once again to FIG. 1 exclusively, it can be seen that frame 12 between triangular support platform 16 at the front end of separator 10 and rectangular support platform 24 at the back end thereof is formed into a box-like framework 46 within which the actual separation of mixture 28 into sink fraction 32 and float fraction 30 thereof is effected using fluidized bed principles.

Extending a substantial distance above the top of box-like framework 46 is an air intake stack 48 through which to draw ambient air into the pneumatic system of separator 10. The height of open upper end 50 of air intake stack 48 enables air blowers 52 communicating with the bottom end 54 thereof to draw air in the direction shown by arrows F into that pneumatic system which is relatively free of dust generated by separator 10 itself. Air from air blowers 52 passes through ducting 56 and flexible piping 58 to columnar enclosure 18 as shown by arrows G.

Further processing of the air utilized in the pneumatic system of separator 10 will be described subsequently, but it should be noted that the placement of air blowers 52 at the intake end of the pneumatic system of separator 10 causes all air passing therein, with the exception only of air moving through air intake stack 48, to be in a state of positive pressure. This advantageously precludes entry into the pneumatic system of airborne dust at any point downstream from air blowers 52. Accordingly, pneumatic systems passageways, such as ducting 56 and flexible piping 58, need not be absolutely air tight in order to preserve the purity of the air therein. Any cracks or small openings in such passageways will inherently permit the escape of air outflow from the pneumatic system. To facilitate the transportation of separator 10 and to reduce the chance of wind damage to air intake stack 48 when separator 10 is not in use, the bottom 54 of air intake stack 48 is provided with a hinge mechanism 60 which permits air intake stack 48 to be lowered against the top of box-like framework 46 as shown by dashed lines in FIG. 2.

The space interior to box-like framework 46 toward the back end of separator 10 is occupied by a horizontally disposed recirculation drum 64 supported for rotation about the longitudinal axis thereof on several pairs of drive wheels 66 mounted in bearings 68 on each side of recirculation drum 64. The axles of drive wheels 66 on each side of recirculation drum 64 are interconnected by shafts 70 and chain couplings 72. In this manner all drive wheels 66 on one side of recirculation drum 64 will flexibly support the weight thereof and nevertheless be driven together by a single hydraulic motor 74 in order to rotate recirculation drum 64. The two hydraulic motors 74 on each side of recirculation drum 64 are connected in parallel with each other and powered by a single conventional hydraulic pump. This arrangement permits variation in the speed at which recirculation drum 64 is rotated and automatically compensates for the uneven loading of the two sides of recirculation drum 64 which is encountered in normal operation of separator 10. The nature of the asymmetrical loading of recirculation drum 64 will be appreciated more fully in relation to the discussion of FIG. 8 subsequently.

To enhance the traction between drive wheels 66 and recirculation drum 64, the exterior of the latter is provided at the portions bearing against drive wheels 66 with traction track 76. Recirculation drum 64 is retained in position supported on drive wheel 66 by sets of idler wheels 78 which contact the outer surface of recirculation drum 64 above and on each side of the longitudinal axis thereof at traction tracks 76. Longitudinal displacement of recirculation drum 64 is precluded by bearing wheels 80 thereof which engage lateral annular end surfaces 82 at each end of recirculation drum 64. For the purpose of separator 10, recirculation drum 64 is rendered capable of rotation at a speed of from zero to six revolutions per minute, and typically at about four revolutions per minute.

The space within box-like framework 46 at the front end of separator 10 encloses an operator control platform 84 from which vantage point the functioning of separator 10 can be observed and controlled. Other equipment is enclosed in box-like framework 46 but will be described in relation to other of the figures.

Figure 2:
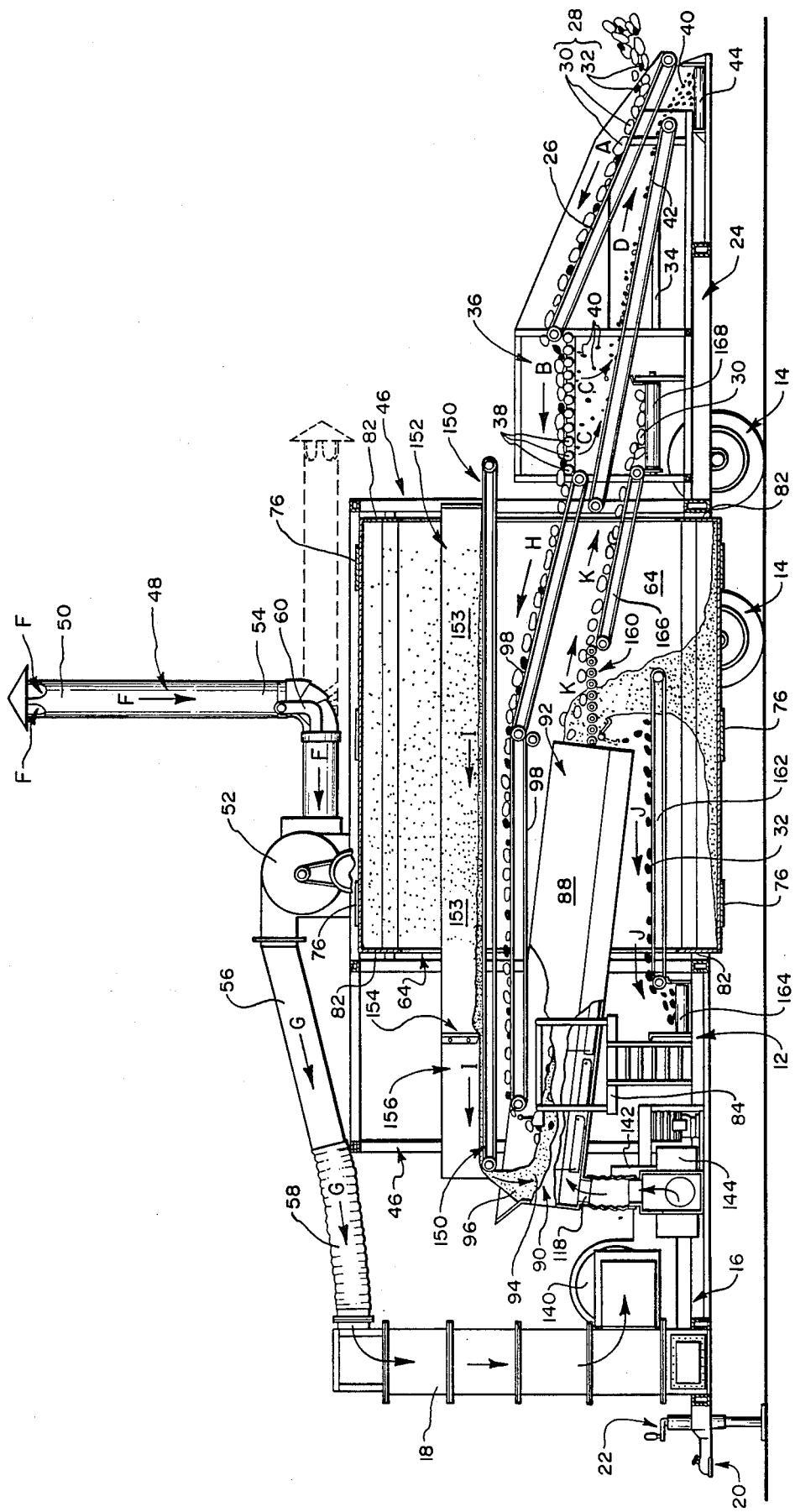
FIG. 2 is an elevation view in partial cross-section of the embodiment of the separator illustrated in FIG. 1 taken along section line 2—2 shown therein.

As best understood in relation to FIG. 2, separator 10 includes a channelization means in the form of an inclined trough 88 having an elevated input end 90 and an output end 92. Trough 88 contains a fluidized bed 94, enabling it to flow under the influence of gravity from input end 90 to output end 92. Fluidization bed 94 is comprised of a fluidization medium 96, such as sand, which is supplied to input end 90 of trough 88 in a manner yet to be described. Mixture 28 from cleaning enclosure 36 is transported upon mixture conveyor 98 in the direction shown by arrow H also to input end 90 of trough 88 for entrainment in fluidized bed 94.

The creation of fluidized bed 94 from fluidization medium 96 occurs as a result of forcing air upwardly through the fluidization medium 96 in trough 88 by a pneumatic means better understood in relation to FIGS. 3, 4, 5, and 5a taken together. As seen therein, trough 88 includes sidewalls 110, 112 which narrow toward output end 92 of trough 88. Input end 90 of trough 88 is formed into an inclined end wall 114. The bottom of trough 88 comprises an air distribution plate 116 which may be a high density perforated polyethylene plate or porous metal sheet. For the purposes of sorter 10, a gas distribution plate 116 having an average opening of 30 microns and a flow rate of 50 standard cubic feet per minute has proven satisfactory. Ultimately, ambient air taken in through intake stack 48 and pretreated in a manner to be described in detail hereafter is directed through air distribution plate 116 and forced upwardly through the layer of fluidization medium 96 supported in trough 88 thereupon.

Air for this purpose enters a series of chambers below trough 88 and air distribution plate 116 through an orifice 118 shown in FIGS. 2 and 3 in the bottom wall of an air receiving chamber 120 of triangular cross-section beneath inclined end wall 114 of trough 88. The air then divides and passes on either side of trough 88 through rectangular air plenums 122, 124 which extend the full length of trough 88. Below air distribution plate 116 are a series of gas pressure chambers 126 which each open onto one or the other of air plenums 122, 124 through a plurality of circular air intake openings 128. Air under pressure in air plenums 122, 124 thus passes through air intake openings 128 into gas pressure chambers 126 and is forced upwardly through air distribution plate 116 and fluidization medium 96 thereabove to create fluidized bed 94.

Each set of air intake openings 128 is adjustably occludable by a pivoted air pressure control plate 130 which may be raised and lowered by a control cable 132 attached to one end thereof. Ultimately such occlusion impacts the effective density of fluidized bed 94 above each individual air pressure chamber 126. Partially covering intake openings 128 by lowering the pressure control plate 130 thereat reduces the air pressure in the associated air pressure chamber 126 in relation to that existing in air plenums 122, 124. Thus, air intake openings 128 in combination with air pressure control plates 130 serve as air pressure reducing valves for each of air pressure chambers 126.

The narrowing of sidewalls 110, 112 toward the output end 92 of trough 88 causes the depth of fluidized bed 94 to increase in the direction of its flow. Nevertheless, it is desirable for optimally efficient separation of mixture 28 into float fraction 30 and sink fraction 32 that the effective density of fluidized bed 94 be held constant, regardless of any variation in its depth. A shallow fluidized bed requires less air flow to achieve the same effective density than does a deeper one. Decreased air flow in the shallower portions of fluidized bed 94 is therefore utilized to maintain a uniform density therein. The air pressure in each of air pressure chambers 126 immediately below air distribution plate 116 is individually adjusted toward that end by manipulating air pressure plates 130. The air in air pressure chambers 126 is thereby graduated so that the pressure of the air in each decreases corresponding to the distance of each air pressure chamber 126 along distribution plate 116 from output end 92 of trough 88. This adjustment of air pressure is intended to correspond roughly to the variation in the depth of fluidized bed 94 along the length of trough 88.

Control cables 132 for manipulation of air control plate 130 terminate at control platform 84 to permit operation of separator 10 from a central location. The lower portion of each gas pressure chamber 126 is provided with a cleanout hatch 134 to facilitate maintenance, while the outer walls of air plenums 122, 124 at each air pressure control plate 130 are provided with access hatches 136 to permit servicing of the pneumatic system at those locations.

In accordance with one aspect of the present invention, air pretreatment means are provided for producing from ambient air conditioned air suitable for creating a fluidized bed from fluidized medium 96 and for supplying such conditioned air to the pneumatic means described above. As used herein, the expression "suitable for creating a fluidized bed" when used in reference to conditioned air in the pneumatic system of separator 10 refers to ambient air which has been subjected to any of the following treatments singly or in combination: (1) removal of particles exceeding a predetermined particle size which could tend to clog the holes in air distribution plate 116, (2) heating to a temperature adequately elevated to remove moisture from fluidized bed 94, (3) initial collection for the pneumatic system at a substantial distance above box-like framework 46 to avoid drawing in therewith dust created by the operation of separator 10, or (4) maintenance under positive pressure to prevent unwanted entry into the pneumatic or air pretreatment means of dust in the ambient air external thereto.

As shown by way of example and not limitation, and as discussed earlier in reference to FIGS. 1 and 2, air intake stack 48 permits the collection of ambient air at a height above box-like framework 46 which minimizes the intake of dust created by the operation of separator 10. Air blowers 52 keep air downstream therefrom under a state of positive pressure so as to prevent the entry of dust. Columnar enclosure 18 houses air filters designed for removing large volumes of fine dust as small as 3.0 microns. Doing so reduces clogging of air distribution plate 116. Suitable air filters for this purpose include the FT-40 and FT-140 cloth air filters manufactured by Dustkop ®.

Following treatment in columnar enclosure 18, air for the pneumatic means for separator 10 passes through secondary air blowers 140 and 142. These operate in series to provide air under positive pressure to an air heater 144 which heats the air prior to its passage through orifice 118 into the pneumatic means of separator 10. A conventional air heater with a 350,000 BTU capacity will serve adequately as air heater 114.

Figure 6:
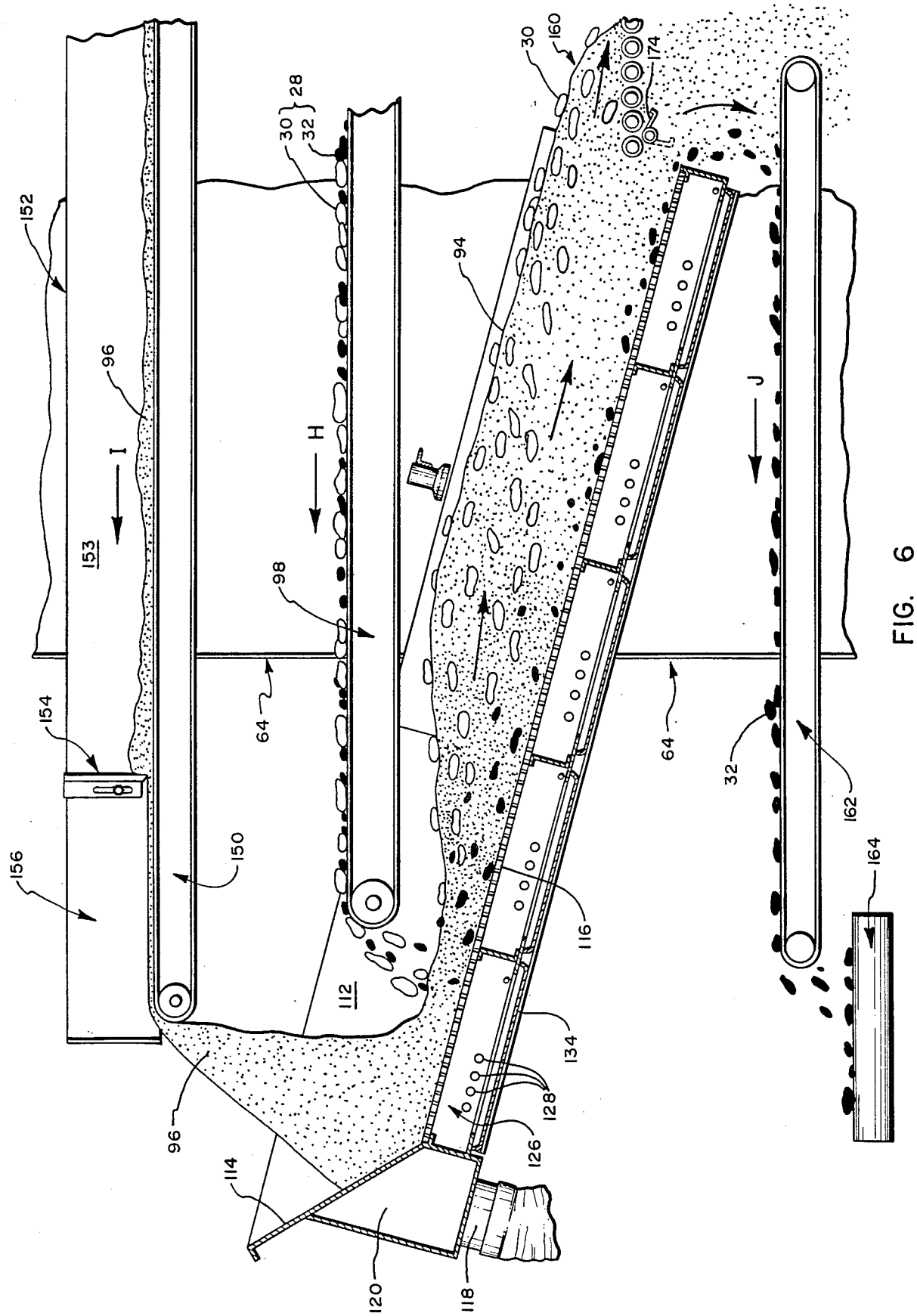
FIG. 6 is an elevational view in partial cross-section of the operation trough and of the conveyors approximate thereto in the separator illustrated in FIG. 1.

The operation of fluidized bed 94 to separate the float fraction 30 and sink fraction 32 of mixture 28 is best understood in relation to FIG. 6. Fluidization medium 96 is provided to input end 90 of trough 88 on an overhead feed conveyor 150 at the bottom of an elongated hopper 152 having outwardly flared sides 153. Hopper 152 is disposed above trough 88 extending at least the full length of recirculation drum 64. Feed conveyor 150 moves fluidization medium 96 in the direction of input end 90 of trough 88 as shown by arrow I.

At the end of hopper 152 closest to input end 90 of trough 88 is a metering means shown in FIG. 6 by way of illustration as a metering gate 154. Metering gate 154 regulates the rate at which fluidization medium 96 is withdrawn from hopper 152 into feed enclosure 156 and supplied to input end 90 of trough 88 by feed conveyor 150. Feed conveyor 150 is at least as wide as input end 90 of trough 88, and the lateral extent of fluidization medium 96 withdrawn from hopper 152 through metering gate 154 on feed conveyor 150 is substantially equal to the width of input end 90 of trough 88. In this manner as fluidization medium 96 falls from the end of feed conveyor 150 adjacent input end 90 of trough 88, it impacts inclined end wall 114 of trough 88, in a uniform quantity from sidewall 110 to sidewall 112. This advantageously contributes to the establishment of fluidized bed 94 early in the passage of fluidization medium 96 through trough 88.

Mixture 28 supplied to input end 90 of trough 88 is entrained in fluidized bed 94. Float fraction 30 and sink fraction 32 of mixture 28 migrate to the top and bottom, respectively, of fluidized bed 94 as it flows through trough 88. At output end 92 of trough 88 a stream splitter 160 separates the upper layer of fluidized bed 94 with float fraction 30 of mixture 28 entrained therein from the lower layer of fluidized bed 94 with the sink fraction 32 of mixture 28 entrained therein. Fluidization medium 96 is cleaned from float fraction 30 and sink fraction 32 by perforated conveyors or a series of rollers for recirculation to feed conveyor 150 in a manner yet to be described.

Sink fraction 32 of mixture 28 accordingly comes to rest on a first sink fraction conveyor 162 which moves the articles of sink fraction 32 in the direction indicated by arrow J for discharge onto a second sink fraction conveyor 164. As seen in FIG. 2, float fraction 30 passes along the top of stream splitter 160 to a first float fraction conveyor 166 for removal in the direction of arrow K to second float fraction conveyor 168.

It has been found that for some combinations of proportions and for some degrees of inclinations of a channelization means, such as trough 88, the establishment of an adequately deep fluidized bed 94 does not occur. Under such circumstances, the vertical separation of float fraction 30 and sink fraction 32 of mixture 28 at output end 92 of trough 88 is inadequate to permit effective separation. Thus, in accordance with the present invention a fluidized bed separator, such as separator 10, is provided with restriction means for assisting the establishment of fluidized bed 94 by temporarily retarding the flow of fluidized bed 94 at output end 92 of trough 88 without substantially changing the volume of trough 88.

As shown herein by way of example and not limitation an obstruction is provided which is selectively interposable into the flow of fluidized bed 94 at output end 92 of trough 88. In one embodiment of the restriction means of the present invention shown in FIG. 6, such an obstruction takes the form of a damper plate 174 pivotally mounted about a horizontal axis at output end 90 of trough 88. To enable the establishment of fluidized bed 94, damper plate 174 is pivoted to the position shown by dash lines in FIG. 6. The additional resistance to the outflow of fluidized bed 94 from output end 90 of trough 88 caused fluidized bed 94 to rise. Once a predetermined acceptable depth is achieved, damper plate 174 is pivoted to mitigate or eliminate totally such restriction to flow.

Damper 174 should not extend to air distribution plate 116 so as to totally restrict the portion of fluidized bed 94 acting upon sink fraction 32. Doing so may cause an accumulation of articles in sink fraction 32 on the bottom trough 88 which is too substantial for the flow of fluidization medium 96 to clear therefrom, even when damper plate 174 is moved into a nonrestricting position.

As a substantial depth to fluidized bed 94 at its emergence from output end 92 of trough 88 is extremely significant to the degree of separation efficiency attainable, the provision of a damper plate 174 is significant. For some fluidization mediums or trough configurations, the use of damper plate 174 to establish a fluidized bed of acceptable depth may not be required. Nevertheless, as the inclination of such a trough is normally variable, as for example, by elevating and lowering input end 90 thereof, or as the density of the fluidization medium employed may vary, as through the absorption of moisture, it is desirable to include a damper plate, such as damper plate 174 with the sorter.

Alternatively, the restricting means of the present invention can take the form of a plurality of damper plates, or a damper plate or plates that are vertically pivotable. One example of such an alternative restriction means is shown in FIG. 7 as comprising damper plates 176, 178 which are mounted to sidewalls 110, 112, respectively, of trough 88 at output end 92 thereof. Damper plates 176, 178 are pivotable about a vertical axis and actuable, for example, by hydraulic or electrical controls 180.

When damper plates, such as damper plates 176, 178, are employed, it will be necessary to space stream splitter 160 shown in FIG. 6 some distance away from output end 92 of trough 88 to afford clearance therebetween for movement of damper plates 176, 178. When this is done, it has been found necessary in addition to lower the position of stream splitter 160 from that shown in FIG. 6 so that it continues to separate an upper layer of fluidized bed 94 with float fraction 30 entrained therein from an underlining layer of fluidized bed entraining sink fraction 32. As fluidized bed 94 passes beyond the edge of air distribution plate 116, the effect of gravity begins to draw fluidized bed 94 downwardly in an arch, so that the further away from trough 88 stream splitter 160 is located, the lower it should be as well.

It is also important that damper plates 176, 178 not be extensive enough to completely close off output end 92 of trough 88. This is substantially the same reasoning provided in relation to the preferred size of damper plate 174.

Once established, it is desirable to maintain fluidized bed 94 at a constant depth. This stability, however, is repeatedly disrupted through the addition to fluidized bed 94 of mixture 28 from mixture conveyor 98. In accordance with the present invention, control means are thus provided for sensing the depth of fluidized bed 94 and based thereon for controlling the rate at which feed conveyor 150 supplies fluidization medium 96 to input end 90 of trough 88. In this manner the depth of fluidized bed 94 can be maintained automatically at a preselected value. As shown by way of example and not limitation, one form of such a control means can take the form of an ultrasonic sensor 188 mounted above trough 88 to detect the distance of the top surface 190 of fluidized bed 94 therefrom. Cylindrical ultrasonic proximity sensors, such as those among the Series PCU Ultrasonic Proximity Sensors marketed by Agastat Corporation, will function adequately for this purpose. Signals from ultrasonic sensor 188 then are used to control the drive means employed in relation to feed conveyor 150.

In yet another aspect of the present invention, medium recirculation means are provided for supplying to input end 90 of trough 88 fluidization medium 96. The medium recirculation means of the present invention laterally encircles output end 92 of trough 88 so as to collect fluidization medium 96 from trough 88 below output end 92 and lift back to trough 88 fluidization medium 96 thus collected.

As shown by way of example and not limitation, recirculation drum 64 is horizontally disposed laterally encircling output end 92 of trough 88 for rotation about its own longitudinal axis. The interior surface 198 of recirculation drum 64 is provided with a continuous plurality of transport pockets 200, which are best appreciated by reference to FIG. 8. Transport pockets 200 receive fluidization medium 96 below output end 92 of trough 88 and, by rotation of recirculation drum 94, unload that fluidization medium 96 above trough 88. Each transport pocket is formed by adjacent pairs of a continuous series of radially directed vanes 102 fitted to the interior surface of recirculation drum 64. The ends of vanes 102 remote from interior surface 198 of recirculation drum 64 are inclined in the direction of the rotation of recirculation drum 64.

Figure 8:
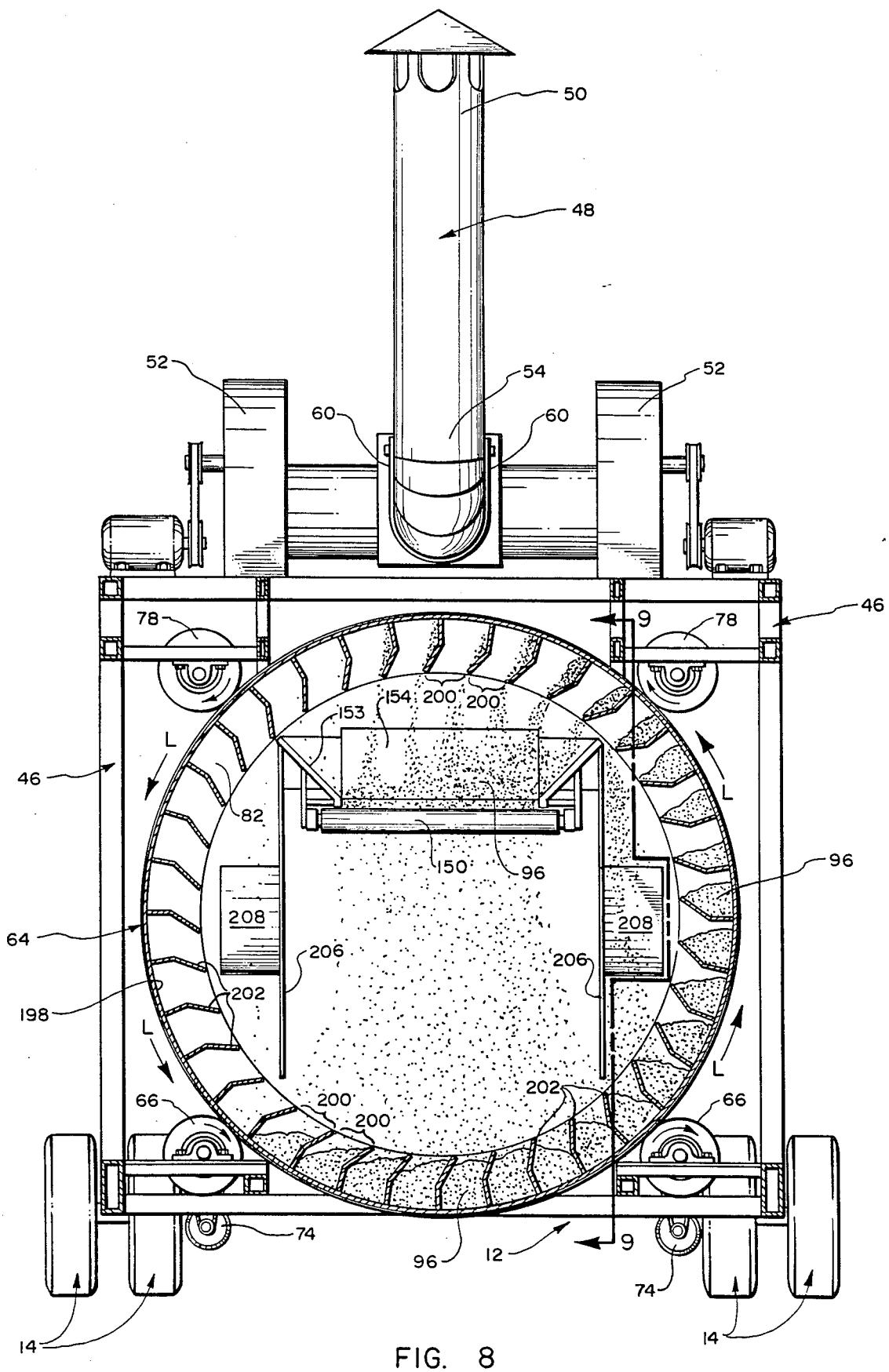
FIG. 8 is a transverse elevation view in partial cross-section of the embodiment of the separator illustrated in FIG. 1 taken along the section line 8—8 shown therein.

As seen in FIGS. 2 and 8 taken together, fluidization medium 96 emerging from output end 92 of trough 88 falls to the bottom of recirculation drum 64 filling transport pockets 200 thereat. Rotation of recirculation drum 64 in the direction indicated in FIG. 8 by arrows L lift that fluidization medium 96 upwardly for unloading into hopper 152. Hopper 152 in combination with feed conveyor 150 functions as a medium translation means for receiving fluidization medium 96 unloaded from transport pockets 200 and transferring such fluidization medium 96 to input end 90 of trough 88 in a manner already described.

It has been found, however, as would be suggested by FIG. 2, that the distribution of fluidization medium 96 longitudinally within recirculation drum 64 is not uniform, but rather heavily concentrated at the central portion thereof corresponding to the position of output end 92 of trough 88. Accordingly, transport pockets 200 at that longitudinal position on recirculation drum 64 are over filled. When they are lifted and turned sideways due to rotation of recirculation drum 64, in route to the top of recirculation drum 64, quantities of fluidization medium 96 spill therefrom before arriving above the inclined sides 204 of hopper 152.

Figure 9:
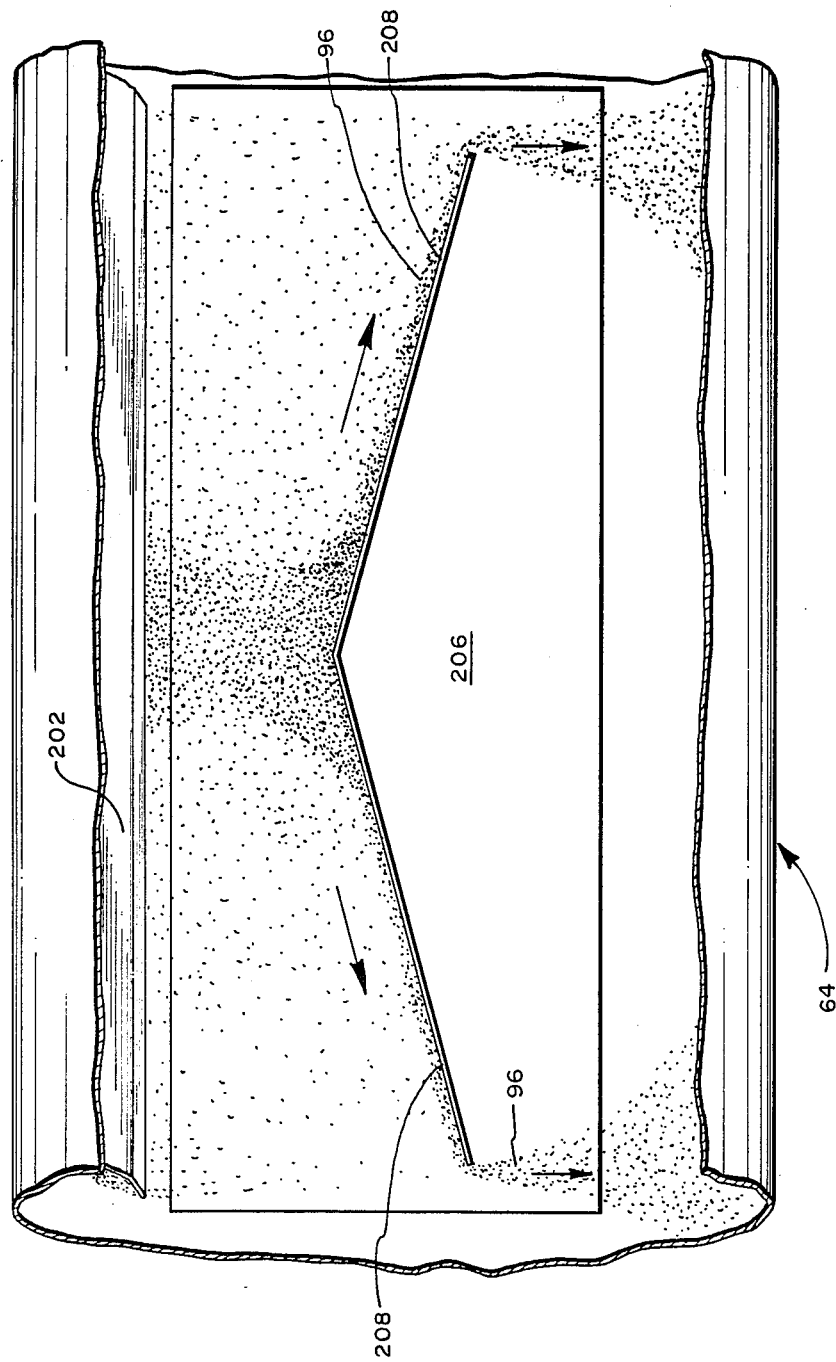
FIG. 9 is an elevation view in partial cross-section taken along section 9—9 of FIG. 8.

In order to distribute this excess fluidization medium 96 longitudinally in recirculation drum 64, vertical skirts 210 are attached to the outer edges of inclined sides 153 of hopper 152 and fitted on the side facing fluidization drum 64 with fluidization medium dispersal ramps 208 which slope downwardly and outwardly in relation to the length of recirculation drum 64. This relationship is best understood by relation to FIG. 9. Fluidization medium 96 falling from transport pockets 102 outside of hopper 152 is thus directed by fluidization medium disposal ramps 208 back to the floor of recirculation drum 64 at points remote from the center thereof.

Use of a recirculation means such as that of the present invention results in a sorter 10 which is shorter laterally by approximately 30% than a sorter employing conventional conveyors to lift fluidization medium back into the channelization means of the apparatus. In addition, recirculation drum 64 provides a cover protecting the fluidization medium therein from water, such as rain and dew, when the device is not in use. As substantially all separating and cleaning occurs within recirculation drum 64 the dispersal of dust from that process is substantially reduced by the enclosure afforded by recirculation drum 64. Such a recirculation means has also been found to require less fluidization medium than corresponding known fluidized bed separators.

The method and apparatus of the present invention also permit rapid establishment of a fluidized bed and automatic maintenance of such at a desired depth. The problem of moisture in the fluidization medium is substantially eliminated by pretreatment of the air used to fluidize that medium and by enclosing the sorter portion of the device in a recirculation drum 64. Filtering of air used in the pneumatic means of the device reduces down time due to dust created in the air about the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for using a fluidized bed to effect separation of articles into a float fraction of a mixture made up of articles generally having a first density and a sink fraction of the mixture made up of articles generally having a second density that is greater than the first density, the apparatus comprising:
    (a) an inclined channelization means having input and output ends and being otherwise enclosed along the length of the sides and bottom thereof so as to form a continuous channel for containing the fluidized bed and for enabling the fluidized bed to flow under the influence of gravity and without interruption from said input end along the length of said channelization means and out through said output end of said channelization means;
    (b) medium recirculation means for supplying to said input end of said channelization means a fluidization medium from which to create the fluidized bed, said medium recirculation means laterally encircling a substantial portion of said channelization means, including said output end of said channelization means so as to collect fluidization medium as said fluidized bed exits from said output end, said medium recirculation means lifting and returning to said input end of said channelization means the fluidization medium thus collected;
    (c) pneumatic means for forcing air upwardly through said fluidization medium in said channelization means to create the fluidized bed from said fluidization medium; and
    (d) mixture feed means for supplying the mixture of articles to said input end of said channelization means for entrainment in the fluidization bed throughout the length thereof, whereby said separation of said float fraction from said sink fraction is effected as said fluidized bed exits said output end.

2. An apparatus as recited in claim 1, wherein said medium recirculation means comprises an endless sequence of transport pockets movable continuously between a load position below said output end of said channelization means and a discharge position thereabove, said transport pockets receiving fluidization medium from said channelization means in said load position and unloading fluidization medium in said discharge position.

3. An apparatus as recited in claim 2, wherein said medium recirculation means further comprises medium translation means for receiving fluidization medium unloaded from said transport pockets in said discharge position thereof and transferring said fluidization medium to said input end of said channelization means.

4. An apparatus as recited in claim 3, wherein said medium translation means comprises:
    (a) a hopper disposed above said channelization means below said discharge position of said transport pockets; and
    (b) a feed conveyor at the bottom of said hopper for moving fluidization medium therein in the direction of said input end of said channelization means.

5. An apparatus as recited in claim 4, wherein said medium translation means further comprises metering means at the end of said hopper closest to said input end of said channelization means for regulating the rate at which fluidization medium is withdrawn from said hopper and supplied to said input end of said channelization means by said feed conveyor.

6. An apparatus as recited in claim 1, wherein said medium recirculation means comprises a recirculation drum horizontally disposed laterally encircling said output end of said channelization means for rotation about the longitudinal axis of said recirculation drum.

7. An apparatus as recited in claim 6, wherein the interior surface of said recirculation drum is provided with a continuous plurality of transport pockets for receiving fluidization medium from said channelization means below said output end thereof and, by rotation of said recirculation drum, for unloading said fluidization medium above said channelization means.

8. An apparatus as recited in claim 6, wherein the interior surface of said recirculation drum is fitted with a continuous series of radially directed vanes, successive pairs of said vanes receiving therebetween fluidization medium from said output end of said channelization means and, by rotation of said recirculation drum, unloading fluidization medium above said channelization means.

9. An apparatus as recited in claim 8, wherein the ends of said vanes remote from said inner surface of said recirculation drum are inclined relative to said vanes in the direction of rotation of said recirculation drum.

10. An apparatus as recited in claim 6, further comprising medium translation means for receiving fluidization medium unloaded from said transport pockets and transferring said fluidization medium to said input end of said channelization means.

11. An apparatus as recited in claim 10, wherein said medium translation means comprises:
(a) a hopper disposed above said channelization means within said recirculation drum; and
(b) a feed conveyor at the bottom of said hopper for moving fluidization medium therein in the direction of said input end of said channelization means.

12. An apparatus as recited in claim 11, wherein said medium translation means further comprises metering means at the end of said hopper closest to said input end of said channelization means for regulating the rate at which fluidization medium is withdrawn from said hopper and supplied to said input end of said channelization means by said feed conveyor.

13. An apparatus as recited in claim 12, wherein said feed conveyor is at least as wide as said input end of said channelization means and wherein the lateral extent of said fluidization medium withdrawn from said hopper through said metering means on said feed conveyor is substantially equal to the width of said input end of said channelization means.

14. An apparatus as recited in claim 6, wherein said recirculation drum is supported on each side of the longitudinal axis thereof by drive wheels.

15. An apparatus as recited in claim 14, wherein said recirculation drum is retained in position supported on said drive wheels by idler wheels contacting the outer surface of said recirculation drum above and on each side of the longitudinal axis thereof.

16. An apparatus as recited in claim 14, wherein said recirculation means further comprises drive means capable of turning each of said drive wheels in a common direction, thereby to rotate said recirculation drum.

17. An apparatus as recited in claim 16, wherein said drive means comprises:
(a) a pneumatic pump; and
(b) first and second pneumatic motors connected to said pneumatic pump in parallel with each other for turning individual corresponding ones of said drive wheels.

18. An apparatus as recited in claim 1, further comprising air pretreatment means for producing from ambient air conditioned air suitable for creating the fluidized bed from said fluidization medium, said air pretreatment means supplying said conditioned air to said pneumatic means.

19. An apparatus as recited in claim 1, further comprising control means for sensing the depth of the fluidized bed and in relation thereto for controlling the rate at which said medium feed means supplies fluidization medium to said input end of said channelization means, whereby to maintain said depth of the fluidized bed at a predetermined value.

20. An apparatus as recited in claim 1, further comprising restriction means for assisting the establishment of the fluidized bed by temporarily retarding the flow of the fluidized bed at said output end of said channelization means without substantially changing the volume of said channelization means.

21. An apparatus as recited in claim 18, further comprising control means for sensing the depth of the fluidized bed and based thereon for controlling the rate at which said medium feed means supplied fluidization medium to said input end of said channelization means, whereby to maintain said depth of the fluidized bed at a predetermined value.

22. An apparatus as recited in claim 18, further comprising restriction means for assisting the establishment of the fluidized bed by temporarily retarding the flow of the fluidized bed at said output end of said channelization means without substantially changing the volume of said channelization means.

23. An apparatus as recited in claim 19, further comprising restriction means for assisting the establishment of the fluidized bed by temporarily retarding the flow of the fluidized bed at said output end of said channelization means without substantially changing the volume of said channelization means.

24. An apparatus for using a fluidized bed to effect separation of a mixture of articles into a float fraction of the mixture made up of articles generally having a first density and a sink fraction of the mixture made up of articles generally having a second density that is greater than the first density, the apparatus comprising:
(a) a container for a fluidization medium from which to create the fluidized bed, said container comprising a channelization means having input and output ends for enabling the fluidized bed to flow under the influence of gravity from said input end to said output end thereof;
(b) pneumatic means for forcing air upwardly through said fluidization medium in said container to create the fluidized bed froms aid fluidization medium;
(c) air pretreatment means for producing from ambient air conditioned air suitable for creating the fluidized bed from said fluidization medium, said air pretreatment means supplying said conditioned air to said pneumatic means and comprising an air intake stack extending a substantial distance above the top of said channelization means and an air blower above said channelization means in communication with the lower end of said air intake stack for supplying air therefrom under positive pressure to said pneumatic means;

(d) medium feed means for supplying said fluidization medium to said input end of said channelization means; and (e) mixture feed means for supplying the mixture of articles to said input end of said channelization means for entrainment in the fluidized bed.

25. An apparatus as recited in claim 24, wherein said air pretreatment means comprises a particle filter for removing from ambient air particles exceeding a predetermined particle size.

26. An apparatus as recited in claim 25, wherein said air pretreatment means further comprises an air heater for heating ambient air to a temperature adequately elevated to remove moisture from the fluidized bed.

27. An apparatus as recited in claim 24, wherein said air pretreatment means comprises an air heater for heating ambient air to a temperature adequately elevated to remove moisture from the fluidized bed.

28. An apparatus as recited in claim 24, wherein said air pretreatment means further comprises:
(a) a particle filter for removing from ambient air particles exceeding a predetermined particle size; and
(b) a second air blower for supplying filtered air under positive
pressure from said particle filter to said pneumatic means.

29. An apparatus as recited in claim 24, wherein said air pretreatment means further comprises:
(a) an air heater for heating ambient air to a
temperature adequately elevated to remove moisture from
the fluidized bed; and
(b) a second air blower for supplying air under positive
pressure through said air heater to said pneumatic means.

30. An apparatus as recited in claim 24, wherein said air pretreatment means further comprises:
(a) a particle filter for removing from ambient air
particles exceeding a predetermined particle size;
(b) an air heater in series with said particle
filter for heating ambient air to a temperature
adequately elevated to remove moisture from the fluidized
bed; and
(c) a second air blower for supplying conditioned air
under positive
pressure
to said pneumatic means.

31. An apparatus as recited in claim 24, further comprising control means for sensing the depth of the fluidized bed and based thereon for controlling the rate at which said medium feed means supplies fluidization medium to said input end of said channelization means, whereby to maintain said depth of the fluidized bed at a predetermined value.

32. An apparatus as recited in claim 31, further comprising restriction means for assisting the establishment of the fluidized bed by temporarily retarding the flow of the fluidized bed at said output end of said channelization means without substantially changing the volume of said channelization means.

33. An apparatus as recited in claim 24, further comprising restriction means for assisting the establishment of the fluidized bed by temporarily retarding the flow of the fluidized bed at said output end of said channelization means without substantially changing the volume of said channelization means.

34. An apparatus for using a fluidized bed to effect separation of a mixture of articles into a float fraction of the mixture made up of articles generally having a first density and a sink fraction of the mixture made up of articles generally having a second density that is greater than the first density, the apparatus comprising:
(a) channelization means having input and output ends for containing the fluidized bed and enabling the fluidized bed to flow under the influence of gravity from said input end to said output end of said channelization means;
(b) medium feed means for supplying to said input end of said channelization means a fluidization medium from which to create the fluidized bed;
(c) pneumatic means for forcing air upwardly through said fluidization medium in said channelization means to create the fluidized bed from said fluidization medium;
(d) mixture feed means for supplying the mixture of articles to said input end of said channelization means for entrainment in the fluidized bed; and
(e) control means for sensing the depth of the fluidized bed and based thereon for controlling the rate at which said medium feed means supplies fluidization medium to said input end of said channelization means, whereby to maintain said depth of the fluidized bed at a predetermined value.

35. An apparatus as recited in claim 34, wherein said control means comprises an ultrasonic sensor mounted above said channelization means to detect the distance from said ultrasonic sensor to the top surface of the fluidized bed in said channelization means.

36. An apparatus as recited in claim 34, further comprising restriction means for assisting the establishment of the fluidized bed by temporarily retarding the flow of the fluidized bed at said output end of said channelization means without substantially changing the volume of said channelization means.

37. An apparatus as recited in claim 36, wherein said restriction means comprises an obstruction selectively interposable to the flow of the fluidized bed at said output end of said channelization means.

38. An apparatus as recited in claim 37, wherein said obstruction comprises a damper plate pivotally mounted at said output end of said channelization means.

39. An apparatus for using a fluidized bed to effect separation of a mixture of articles into a float fraction of the mixture made up of articles generally having a first density and a sink fraction of the mixture made up of articles generally having a second density that is greater than the first density, the apparatus comprising:
(a) channelization means having input and output ends and being otherwise enclosed so as to form a continuous channel for containing the fluidized bed, said channelization means sloping downward from said input end to said output end so as to enable the fluidized bed to flow under the influence of gravity from said input end along the length of said channelization means and out through said output end of said channelization means;
(b) medium feed means for supplying to said input end of said channelization means a fluidization medium from which to create the fluidized bed;
(c) pneumatic means for forcing air upwardly through said fluidization medium in said channelization means to create the fluidized bed from said fluidization medium;

(d) restriction means for assisting the establishment of the fluidized bed by temporarily retarding the flow of the fluidized bed at said output end of said channelization means, without substantially changing the volume of said channelization means, until an adequate depth of said fluidized bed is established for purposes of effecting said separation; and (e) mixture feed means for supplying the mixture of articles to said input end of said channelization means for entrainment in the fluidized bed throughout the length thereof, whereby said separation of said float fraction from said sink fraction is effected as said fluidized bed exits said output end.

40. An apparatus as recited in claim 39, wherein said restriction means comprises an obstruction selectively interposable to the flow of the fluidized bed at said output end of said channelization means.

41. An apparatus as recited in claim 40, wherein said obstruction is adjustably interposable to the flow of the fluidized bed at said output end of said channelization means.

42. An apparatus as recited in claim 41, wherein said obstruction comprises a damper plate pivotally mounted at said output end of said channelization means.

43. An apparatus as recited in claim 42, wherein said damper plate is horizontally pivotable.

44. An apparatus as recited in claim 42, wherein said damper plate is vertically pivotable.

45. An apparatus as recited in claim 41, wherein said obstruction comprises a plurality of damper plates pivotably mounted at said output end of said channelization means.

46. An apparatus as recited in claim 41, wherein said obstruction comprises a pair of damper plates pivotably mounted at said output end of said channelization means.

47. An apparatus as recited in claim 46, wherein said of said damper plates is mounted at the output end of said channelization means to respective side walls thereof for pivoting about a vertical axis.

48. An apparatus as recited in claim 39, further comprising a stream splitter horizontally disposed at said output end of said channelization means for separating an upper layer of the fluidized bed with the float fraction of the mixture entrained therein from a lower layer of the fluidized bed with the sink fraction of the mixture entrained therein, and wherein said restriction means is located below said stream splitter.

49. An apparatus for using a fluidized bed to effect separation of a mixture of articles into a float fraction of the mixture made up of articles generally having a first density and a sink fraction of the mixture made up of articles generally having a second density that is greater than the first density, the apparatus comprising:

(a) channelization means having input and output ends for containing the fluidized bed and enabling the fluidized bed to flow under the influence of gravity from said input end to said output end of said channelization means;

(b) medium recirculation means for supplying to said input end of said channelization means a fluidization medium from which to create the fluidized bed, said medium recirculation means laterally encircling said output end of said channelization means to collect said fluidized medium from said channelization means below said output end thereof and lift to said channelization means fluidization medium thus collected;

(c) pneumatic means for forcing air upwardly through said fluidization medium in said channelization means to create the fluidized bed from said fluidization medium;

(d) air pretreatment means for producing from ambient air conditioned air suitable for creating the fluidized bed from said fluidization medium, said air pretreatment means supplying said conditioned air to said pneumatic means; and (e) restriction means for assisting the establishment of the fluidized bed by temporarily retarding the flow of the fluidized bed at said output end of said channelization means without substantially changing the volume of said channelization means;

(f) control means for sensing the depth of the fluidized bed and based thereon for controlling the rate at which said medium recirculation means supplies fluidization medium to said input end of said channelization means, whereby to maintain said depth of the fluidized bed at a predetermined value; and (g) mixture feed means for supplying the mixture of articles to said input end of said channelization means for entrainment in the fluidized bed.

50. An apparatus for using a fluidized bed to effect separation of a mixture of articles into a float fraction of the mixture made up of articles generally having a first density and a sink fraction of the articles generally having a second density that is greater than the first density, the apparatus comprising:

(a) an inclined channelization means having input and output ends and being otherwise enclosed along the length of the sides and bottom thereof so as to form a continuous channel for containing the fluidized bed and for enabling the fluidized bed to flow under the influence of gravity and without interruption from said input end along the length of said channelization means and out through said output end of said channelization means;

(b) medium translation means located above said channelization means for supplying to said input end of said channelization means a fluidization medium from which to create the fluidized bed;

(c) a recirculation drum horizontally disposed laterally encircling a substantial portion of said channelization means, including said output end of said channelization means, for rotation about the longitudinal axis of said recirculation drum, said recirculation drum collecting fluidization medium from said channelization means below said output end thereof and lifting to said medium translation means fluidization medium thus collected;

(d) pneumatic means for forcing air upwardly through said fluidization medium in said channelization means to create the fluidized bed from said fluidization medium;

(e) air pretreatment means for producing from ambient air conditioned air suitable for creating the fluidized bed from said fluidization medium, said air pretreatment means supplying said conditioned air to said pneumatic means;

(f) restriction means for assisting the establishment of the fluidized bed by temporarily retarding the flow of the fluidized bed at said output end of said channelization means without substantially changing the volume of said channelization means, until an adequate depth of said fluidized bed is established for purposes of effecting said separation; and (g) mixture feed means for supplying the mixture of articles to said input end of said channelization means for entrainment in the fluidized bed throughout the length thereof whereby said separation of said float fraction from said sink fraction is effected as said fluidized bed exits said output end.

51. An apparatus as recited in claim 50, further comprising control means for sensing the depth of the fluidized bed and based thereon for controlling the rate at which said medium translation means supplied fluidization medium to said input end of said channelization means, whereby to maintain the depth of the fluidized bed at a predetermined value.

52. An apparatus as recited in claim 51, wherein said control means comprises an ultrasonic sensor mounted above said channelization means to detect the distance from ultrasonic sensor to the top surface of the fluidized bed in said channelization means.

53. An apparatus as recited in claim 50, wherein said restriction means comprises an obstruction selectively and adjustably interposable to the flow of the fluidized bed at said output end of said channelization means.

54. An apparatus as recited in claim 53, wherein said obstruction comprises a damper plate pivotally mounted at said output end of said channelization means.

55. An apparatus as recited in claim 53, wherein said obstruction comprises a plurality of damper plates mounted for pivoting about a vertical axis at said output end of said channelization means.

56. An apparatus as recited in claim 50, further comprising a means at said output end of said channelization means for separating an upper layer of the fluidized bed with the float fraction of the mixture entrained therein from a lower layer of the fluidized bed with the sink fraction of the mixture entrained therein, and wherein said restriction means is located below said means for separating.

57. An apparatus as recited in claim 50, wherein said medium translation means comprises:
(a) a hopper disposed above said channelization means within said recirculation drum; and
(b) a feed conveyor at the bottom of said hopper for moving fluidization medium therein in the direction of said input end of said channelization means.

58. An apparatus as recited in claim 57, wherein said medium translation means further comprises metering means at the end of said hopper close to said input end of said channelization means for regulating the rate at which fluidization medium is withdrawn from said hopper and supplied to said input end of said channelization means by said feed conveyor.

59. An apparatus as recited in claim 58, wherein said feed conveyor is at least as wide as said input end of said channelization means and wherein the lateral extent of said fluidization medium withdrawn from said hopper through said metering means on said feed conveyor is substantially equal to the width of said input end of said channelization means.

60. An apparatus as recited in claim 50, wherein the interior surface of said recirculation drum is fitted with a continuous series of radially directed vanes, successive pairs of said vanes receiving therebetween fluidization medium from said output end of said channelization means and by rotation of said recirculation drum unloading fluidization medium into said medium translation means.

61. An apparatus as recited in claim 50, wherein said recirculation drum is supported on each side of the longitudinal axis thereof by drive wheels.

62. An apparatus as recited in claim 61, wherein said recirculation drum is retained in position supported on said drive wheels by idler wheels contacting the outer surface of said recirculation drum above and on each side of the longitudinal axis thereof.

63. An apparatus as recited in claim 62, further comprising drive means capable of turning each of said drive wheels in a common direction, thereby to rotate said recirculation drum.

64. An apparatus as recited in claim 63, wherein said drive means comprises:
(a) a pneumatic pump; and
(b) first and second pneumatic motors connected to said pneumatic pump in parallel with each other for turning individual each of said drive wheels.

65. An apparatus as recited in claim 50, wherein said air pretreatment means comprises:
(a) an air intake stack extending a substantial distance above the top of said recirculation drum; and
(b) an air blower above said recirculation drum in communication with the lower end of said air intake stock for supplying air therefrom under positive pressure to said pneumatic means.

66. An apparatus as recited in claim 50, wherein said air pretreatment means comprises a particle filter for removing from ambient air particles exceeding a predetermined particle size.

67. An apparatus as recited in claim 50, wherein said air pretreatment means further comprises an air heater for heating ambient air to a temperature adequately elevated to remove moisture from the fluidized bed.

68. A method for separating a mixture of articles into a float fraction of the mixture made up of articles generally having a first density and a sink fraction of the mixture made up of articles generally having a second density that is greater than the first density, the method comprising the steps of:

(a) supplying to an inclined trough having inlet and outlet ends a fluidization medium from which to produce a fluidized bed flowing uninterrupted under the influence of gravity through the entire length of said trough;

(b) forcing air upwardly through said fluidization medium in said trough to produce therefrom the fluidized bed;

(c) temporarily retarding the flow of the fluidized bed at said output end of said trough without substantially changing the volume of said trough until the fluidized bed has been established to a predetermined depth in said trough;

(d) feeding to the upper end of said trough the mixture of articles for entrainment in the fluidized bed, whereby the float fraction and the sink fraction of the articles of the mixture migrate to an upper and a lower layer respectively of the fluidized bed as the fluidized bed flows through said trough; and (e) separating said upper layer of the fluidized bed with the float fraction of the mixture entrained therein from said lower layer of the fluidized bed with the sink fraction of the mixture entrained therein as said fluidized bed and said float and sink fractions exit through the outlet end of said trough.

69. A method as recited in claim 68, further comprising the step of filtering said air forced upwardly through said fluidization medium to remove from said air particles exceeding a predetermined particle size.

70. A method as recited in claim 68, further comprising the step of heating said air forced upwardly through said fluidization medium to a temperature adequately elevated to remove moisture from said fluidization medium.

71. A method as recited in claim 68, further comprising the step of sensing the depth of the fluidized bed and based thereon of controlling the rate at which said fluidization medium is supplied to the upper end of said trough, whereby to maintain said depth of the fluidized bed at a predetermined value.

72. A method as recited in claim 68, wherein said step of supplying comprises the following steps:
  (a) collecting fluidization medium from the output end of said trough in transport pockets on the inner surface of a recirculation drum horizontally disposed laterally encircling said output end of said trough;
  (b) rotating said recirculation drum about the longitudinal axis thereof to lift said fluidization medium collected in said transport pockets and empty said transport pockets above said trough;
  (c) receiving said fluidization medium from said transport pockets in a hopper disposed above said trough within said recirculation drum; and
  (d) removing fluidization medium from said hopper to said input end of said trough on a feed conveyor.

73. An apparatus for using a fluidized bed to effect separation of a mixture of articles into a float fraction of the mixture made up of articles generally having a first density and a sink fraction of the mixture made up of articles generally having a second density that is greater than the first density, the apparatus comprising:
  (a) a container for a fluidization medium from which to create the fluidized bed, said container comprising a channelization means having input and output ends for enabling the fluidized bed to flow under the influence of gravity from said input end to said output end thereof;
  (b) pneumatic means for forcing air upwardly through said fluidization medium in said container to create the fluidized bed from said fluidization medium;
  (c) air pretreatment means for producing from ambient air conditioned air suitable for creating the fluidized bed from said fluidization medium, said air pretreatment means supplying said conditioned air to said pneumatic means;
  (d) medium feed means for supplying said fluidization medium to said input end of said channelization means;
  (e) mixture feed means for supplying the mixture of articles to said input end of said channelization means for entrainment in the fluidized bed; and
  (f) control means for sensing the depth of the fluidized bed and based thereon for controlling the rate at which said medium feed means supplies fluidization medium to said input end of said channelization means, whereby to maintain said depth of the fluidized bed at a predetermined value.

74. An apparatus as recited in claim 73, further comprising medium recirculation means for supplying to said input end of said channelization means a fluidization medium from which to create the fluidized bed, said medium recirculation means laterally encircling said output end of said channelization means to collect fluidized medium from said channelization means below said output end thereof and lift to said channelization means fluidization medium thus collected.

75. An apparatus as recited in claim 73, further comprising restriction means for assisting the establishment of the fluidized bed by temporarily retarding the flow of the fluidized bed at said output end of said channelization means without substantially changing the volume of said channelization means.

* * * * *

UNITED STATES PATENT AND TRADEMARK OFFICE
CERTIFICATE OF CORRECTION

PATENT NO. : 4,865,722

DATED : September 12, 1989

INVENTOR(S) : Max Ririe et al.

It is certified that error appears in the above-identified patent and that said Letters Patent is hereby corrected as shown below:

Column 1, line 30, "effects" should be --affects--
Column 1, line 33, "effecting" should be --affecting--
Column 3, line 54, "effected" should be --affected--
Column 4, line 38, "perforations" should be --perforation--
Column 16, line 33, "fluidization bed" should be --fluidized bed--
Column 19, lines 25-26, sentence should not be disjoined
Column 19, lines 31-32, sentence should not be disjoined
Column 19, lines 35-36, sentence should not be disjoined
Column 19, lines 49-50, sentence should not be disjoined Signed and Sealed this Twenty-second Day of January, 1991

Attest:

HARRY F. MANBECK, JR.

*Attesting Officer*         *Commissioner of Patents and Trademarks*